United States Patent
Barrenscheen et al.

(10) Patent No.: US 6,996,646 B2
(45) Date of Patent: Feb. 7, 2006

(54) BUS SYSTEM

(75) Inventors: Jens Barrenscheen, München (DE); Karl Herz, München (DE); Achim Vowe, München (DE)

(73) Assignee: Infineon Technologies AG, Munich (DE)

( * ) Notice: Subject to any disclaimer, the term of this patent is extended or adjusted under 35 U.S.C. 154(b) by 617 days.

(21) Appl. No.: 10/116,172

(22) Filed: Apr. 4, 2002

(65) Prior Publication Data

US 2002/0156955 A1    Oct. 24, 2002

(30) Foreign Application Priority Data

Apr. 4, 2001    (DE) ................................ 101 16 795

(51) Int. Cl.
    *G06F 13/36*    (2006.01)
(52) U.S. Cl. ..................................... 710/117; 710/124
(58) Field of Classification Search ........ 710/111–125, 710/240–244
    See application file for complete search history.

(56) References Cited

U.S. PATENT DOCUMENTS

| | | | |
|---|---|---|---|
| 4,473,880 A * | 9/1984 | Budde et al. ............. | 710/112 |
| 4,719,567 A * | 1/1988 | Whittington et al. ...... | 710/117 |
| 4,719,569 A * | 1/1988 | Ludemann et al. ........ | 710/241 |
| 4,814,974 A * | 3/1989 | Narayanan et al. ........ | 710/244 |
| 4,939,638 A * | 7/1990 | Stephenson et al. ....... | 710/244 |
| 4,953,081 A * | 8/1990 | Feal et al. .................. | 710/111 |
| 5,072,363 A * | 12/1991 | Gallagher .................. | 710/241 |
| 5,241,632 A * | 8/1993 | O'Connell et al. ........ | 710/117 |
| 5,481,680 A | 1/1996 | Larson et al. | |
| 5,499,345 A * | 3/1996 | Watanabe .................. | 710/117 |
| 5,778,200 A | 7/1998 | Gulick | |
| 5,996,037 A * | 11/1999 | Emnett ..................... | 710/117 |
| 6,178,475 B1 * | 1/2001 | O'Brien ..................... | 710/116 |
| 6,735,653 B2 * | 5/2004 | O Mathuna et al. ....... | 710/105 |
| 6,742,064 B2 * | 5/2004 | Waldie et al. ............. | 710/124 |

FOREIGN PATENT DOCUMENTS

| | | |
|---|---|---|
| EP | 0 179 936 A1 | 5/1986 |
| EP | 0 890 152 B1 | 1/1999 |

* cited by examiner

*Primary Examiner*—Paul R. Myers
(74) *Attorney, Agent, or Firm*—Laurence A. Greenberg; Werner H. Stemer; Ralph E. Locher

(57) ABSTRACT

A bus system has a bus, a number of units which can be connected to one another via the bus, and a bus controller. The units request the bus controller for bus access when they require a connection to one or more other units, and the bus controller decides which unit will be allocated to the bus. The bus system is distinguished in that at least some of the units which can request bus access are allocated values which indicate how long and/or how frequently the relevant unit can be allocated the bus or has been allocated the bus, and in that these values are used to decide whether a unit which is requesting bus access is allocated the bus, or whether a unit which requires bus access is requesting the bus at all.

29 Claims, 1 Drawing Sheet

BUS SYSTEM

BACKGROUND OF THE INVENTION

Field of the Invention

The present invention relates to a bus system having a bus, a number of units that can be connected to one another via the bus, and a bus controller. The units request the bus controller for bus access when they require a connection to one or more other units, and the bus controller decides which unit will be allocated the bus.

Bus systems such as these have been known in many different embodiments for many years.

Reference is had to FIG. 1, which shows the basic design of such a bus system. The system shown in FIG. 1 comprises a bus, identified with the reference symbol BUS; three exemplary units CPU1, CPU2, and RAM, each connected to the bus BUS and connectible to one another via the bus BUS; and a bus controller BUS CTRL connected to the bus and configured to control bus allocation.

In the exemplary prior system, the bus BUS is the internal bus of a microcontroller. The units CPU1 and CPU2 are different cores of the microcontroller. Further, the unit RAM is a memory that can be accessed both by the first core CPU1 and by the second core CPU2.

Of the units CPU1, CPU2, and RAM, the units CPU1 and CPU2 are master units (i.e., units which request the bus and can then become the bus master). The unit RAM is a slave unit (i.e., a unit which may only be a bus slave).

The bus controller BUS CTRL defines which of the existing master units CPU1 and CPU2 may be the bus master 1, when and for how long. The master units CPU1 and CPU2 are for this purpose each connected to the bus controller BUS CTRL via lines REQUEST and GRANT. When one master unit requires the bus BUS in order to output data to one of the other units connected to the bus, or to request data from another unit, it signals this to the bus controller BUS CTRL by outputting an appropriate signal via the line REQUEST. The bus controller then checks whether the bus is free and uses the line GRANT to report to the unit which is requesting the bus that it can use the bus (if the bus is free) or that it cannot use the bus at the moment (if another unit is currently the bus master).

One known problem with such bus systems is that units which have to output data or urgently require data from another unit sometimes have to wait for a very long time before they can be allocated to the bus BUS.

SUMMARY OF THE INVENTION

It is accordingly an object of the invention to provide a bus system, which overcomes the above-mentioned disadvantages of the heretofore-known devices and methods of this general type and which ensures that a unit which has to output data or requires data from another unit can obtain access to the bus within a certain maximum time.

With the foregoing and other objects in view there is provided, in accordance with the invention, a bus system, comprising:

a bus and a plurality of units that are connectable to one another through the bus; and a bus controller configured to receive from the units requests for bus access when the units require a connection to one or more other units, and to decide which unit will be allocated the bus;

wherein at least some of the units that can request bus access are allocated values indicating how long and/or how frequently the respective unit can be or has been allocated the bus, and the bus controller is configured to use the values to decide whether a respective the unit requesting bus access is allocated the bus, or whether a unit requiring bus access is even requesting the bus.

In other words, the bus system according to the invention is distinguished in that at least some of the units which can request bus access are allocated values which indicate how long and/or how frequently the relevant unit can be allocated the bus or has been allocated the bus, and in that these values are used to decide whether a unit which is requesting bus access is allocated the bus, or whether a unit which requires bus access is requesting the bus at all.

By a suitable definition and/or change
  to the values, and/or
  to the condition which a value must satisfy in order that the unit to which the relevant value is allocated can be allocated the bus,
it is possible to define:
  how often each unit can be allocated the bus per unit time, and/or
  how long an individual bus access and/or the sum of all bus accesses may be within a specific time, and/or
  the maximum time for which a unit must wait before being allocated the bus.

The allocation of the bus can be matched to the respective units very easily, and can be optimally matched to the respective requirements with little effort. In particular, it is possible to ensure that each unit which has data to output or requires data from another unit can obtain access to the bus within a certain maximum time; it is possible to preclude one or more units not being allocated the bus at all for lengthy periods, or being allocated the bus only so rarely and/or only for a time which is so short that correct operation of the relevant units is called into question.

In accordance with a variety of further features of the invention, the values can be varied during operation of the bus system. When specific conditions are present, the values are increased by a specific amount, or are reduced by a specific amount, or are set to an initial value. In accordance with another feature of the invention, values which are allocated to the various units (e.g., CPU1, CPU2) can be varied independently of one another. Preferably, the initial values for the various units may have different magnitudes and may be varied during the operation of the bus system.

It is advantageous if the amount by which a value is increased when a specific condition is present, and the amount by which this value is reduced when a specific condition is present may have different magnitudes. The amounts by which the values are increased when a specific condition is present may have different magnitudes for those units, to which such a value is allocated. Also, the amounts by which the values are reduced when a specific condition is present may have different magnitudes for those units to which such a value is allocated.

In a preferred embodiment, the amounts by which the values are increased or reduced when a specific condition is present can be varied during operation of the bus system. For instance, a value which is allocated to a unit which is currently not accessing the bus is increased by the specific amount. Similarly, a value which is allocated to a unit which is currently accessing the bus is reduced by the specific amount. Alternatively, a value which is allocated to a unit which is currently not accessing the bus is reduced by the specific amount and a value which is allocated to a unit which is currently accessing the bus is increased by the specific amount.

In accordance with a preferred embodiment of the invention, the values are changed in each bus cycle.

In further advantageous variations of the invention, a unit which is requesting the bus is allocated the bus only provided the value associated with it is not greater than a specific limit value. Conversely, a unit which is requesting the bus is allocated the bus only provided the value associated with it is not less than a specific limit value.

Also, in an alternative embodiment of the invention, a unit which is requesting the bus is allocated the bus only provided the value associated with it (in the situation where the relevant unit is allocated the bus) would not fall so far as a result of the reduction resulting from the bus access that it is less than a specific limit value, or not rise so far as a result of the increase resulting from the bus access that it is greater than a specific limit value.

Preferably, the limit value is 0.

It is advantageous if the values which are allocated to the units are stored and are administered in the bus controller. Alternatively, or in addition, the values which are allocated to the units are stored and are administered in the units to which they are allocated.

The bus allocation may be made dependent on the ratio of the magnitudes of selected values, or of all the values, of the values which are allocated to the units.

The conditions which the values that are allocated to the units must satisfy in order that a unit which is requesting the bus is allocated the bus are variable. Similarly, the conditions which the values which are allocated to the units must satisfy in order that a unit which is requesting the bus is allocated the bus are different for different units.

In a preferred embodiment of the invention, the bus controller compares the bus allocation and the bus accounts of all the units which are requesting bus access and, as a result of this, allows bus access for one of the units. In a further variation, only selected units are allocated a bus account, and the bus allocation to the remaining units depends on the bus accounts of the selected units.

In another variation of the invention, only selected units are allocated a bus account, and the bus allocation is carried out taking into account priorities which are allocated to the remaining units.

The amount by which the bus account of a unit is varied may be made dependent on which other units have requested the bus at the same time. Similarly, the amount by which the bus account of a unit is varied may depend on the bus accounts of the units which have requested the bus at the same time.

Other features which are considered as characteristic for the invention are set forth in the appended claims.

Although the invention is illustrated and described herein as embodied in a BUS System, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
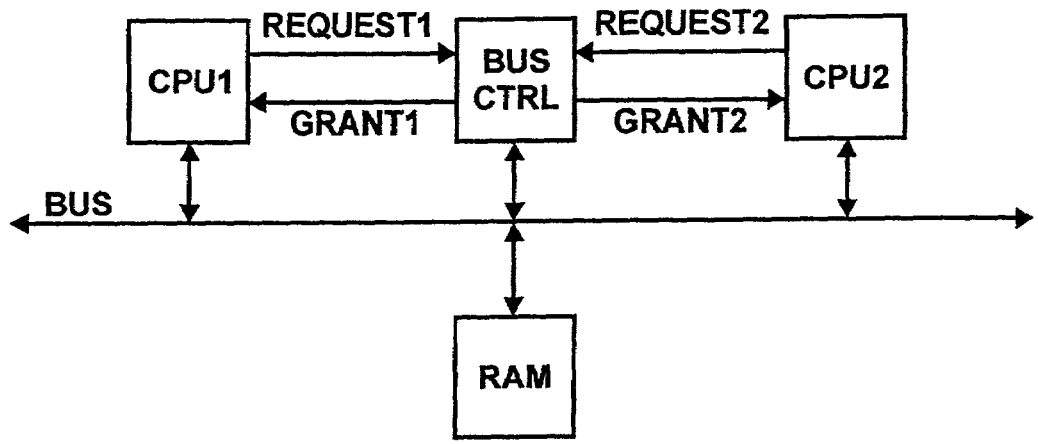
FIG. 1 shows an exemplary embodiment of a bus system of the type considered above.

The bus system described in the following text is in principle configured in the same way as the bus system which is illustrated in FIG. 1 and which is described initially with reference to that figure. The "only" differences in the example under consideration are the design and the method of operation of the units CPU1 and/or CPU2 and/or of the bus controller BUS CTRL.

It should be understood, however, that the units and the embodiment of the system illustrated and described herein, is not intended to limit the invention, and:

that the units which are connected to the bus BUS need not be the units which are illustrated in FIG. 1 and have been described with reference to that figure (in principle, the units which are connected to the bus BUS may be any desired units); and that there is no necessity for the bus system to be a part of a microcontroller (the bus system may also be a part of any other component or may connect a number of components, or specific parts of those components).

The bus controller BUS CTRL under consideration here has the special feature that special values, which are referred to as bus accounts in the following text, are stored and administered in it, and that the bus controller uses the bus accounts to decide whether a unit which is requesting bus access will be allocated the bus. The bus accounts are values which are allocated to the units which can request bus access, and indicate how long and/or how often the relevant unit may be allocated the bus or has been allocated the bus.

Figure 2:
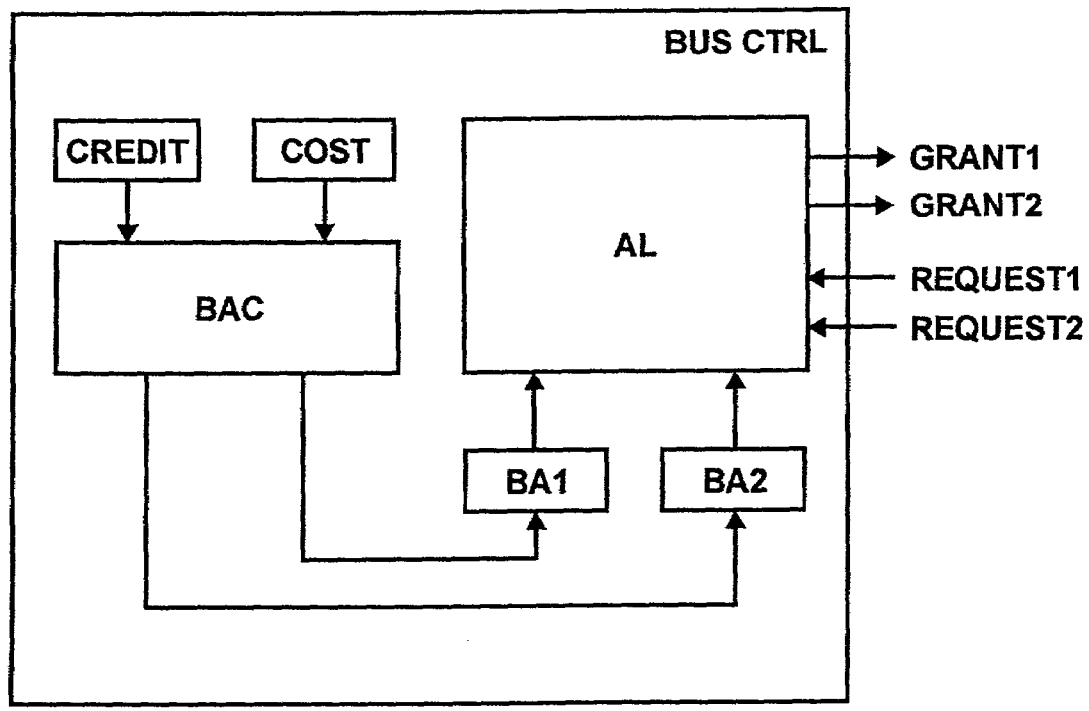
FIG. 2 is a schematic view the configuration of a bus controller according to the invention which is used in the bus system described in the following text.

The basic design of an exemplary embodiment of such a bus controller is shown in FIG. 2.

The illustrated bus controller includes an arbitration logic AL which decides whether and, if necessary, which of the units that are connected to the bus BUS will be allocated the bus. The controller also includes memory units BA1, BA2, CREDIT and COST. The memory device BA1 is used to store the bus account allocated to the unit CPU1. The memory device BA2 is used to store the bus account allocated to the unit CPU2. The memory device CREDIT is used to store a value by which the bus accounts which are stored in the memory devices BA1 and/or BA2 are varied when specific conditions are present (when specific states or events occur). The memory device COST is used to store a value by which the bus accounts which are stored in the memory devices BA1 and/or BA2 are varied when specific different conditions are present (when specific different states or events occur). The controller furthermore contains a bus account control device BAC, by means of which the bus accounts which are stored in the memory devices BA1 and BA2 are varied by the value stored in the memory device CREDIT, or are varied by the value stored in the memory device COST, or are set to a specific value, when the appropriate conditions are present.

When the bus system is being set up and, if necessary, also at greater or lesser intervals during operation, the memory devices BA1 and BA2 are set to specific (initial) values. These initial values may have different magnitudes for the memory devices BA1 and BA2 and, furthermore, may also be varied, as a result of which the memory devices BA1 and BA2 can be set to any desired values, and at any desired times, independently of one another.

In the example under consideration, the memory devices BA1 and BA2 are set to the respective initial values by means of one or more of the units which may be bus masters, that is to say by the units CPU1 and/or CPU2, or by the bus controller BUS CTRL.

The contents of the memory devices CREDIT and COST can likewise be defined and varied independently of one another. The definition and/or variation of these values can likewise be carried out in the example under consideration by one or more of the units which may be the bus master, that is to say by the bus units CPU1 and/or CPU2, or by the bus controller BUS CTRL.

In the example under consideration, the bus controller BUS CTRL initiates and carries out the variation of the values which are stored in the memory devices BA1 and BA2, by the values which are stored in the memory devices CREDIT and COST.

In the example under consideration, the procedure is for the bus accounts which are stored in the memory devices BA1 and BA2 to be increased by the value which is stored in the memory device CREDIT, or to be reduced by the value which is stored in the memory device COST, in each bus cycle, with the bus accounts which are allocated to those units to which the bus is not allocated in the relevant bus cycle being increased, and with the bus account which is allocated to that unit to which the bus is allocated in the relevant bus cycle being reduced.

As mentioned in the introductory text above, the arbitration logic AL operates independently of the bus accounts which are stored in the memory devices BA1 and BA2. To be more precise, a unit which is requesting the allocation of the bus is allocated the bus only when the bus account which is allocated to the relevant unit, in the situation when the relevant unit is allocated the bus, would not fall so far as a result of the reduction in the bus account resulting from the bus access that it is less than a specific limit value, with the said limit value being the value 0 in the example under consideration.

Such bus allocation makes it possible to define how often the individual units can be allocated the bus per unit time, and/or how long an individual bus access, and/or the sum of all the bus accesses may be within a specific time. This allows the bus allocation to be optimally matched with little effort to the respective conditions, even if the conditions vary during operation. In particular, such bus allocation is considerably more flexible than bus allocation which is carried out "only" taking into account priorities which are allocated to the units which can request the bus. In contrast to the situation where the bus is allocated taking into account priorities which are allocated to the units, this is because the described bus allocation process does not come into action only when a number of bus requests occur at the same time. In addition, bus allocation is refused when the unit which is requesting bus access has exhausted its bus access budget; this makes it possible to ensure that each unit can be allocated the bus a specific number of times or for a specific duration within a specific time period.

Obviously, the described bus system can be modified in many ways. In particular, it is possible to provide:

that the amounts by which the bus accounts are varied when the units to which the bus accounts are allocated do not have access to the bus in a bus cycle or of different magnitude for the various units (that the memory devices BA1 and BA2 each have their own associated memory devices CREDIT and that these can be written to and/or amended independently of one another), that the amounts by which the bus accounts are varied when the units to which the bus accounts are allocated access the bus in one bus cycle, are of different magnitudes for the various units (that the memory devices BA1 and BA2 each have their own associated memory devices COST and that these can be written to and/or amended independently of one another), that the bus accounts are increased when the units to which the bus accounts are allocated have access to the bus in one bus cycle, and are reduced when the units to which the bus accounts are allocated do not have access to the bus in one bus cycle, that the bus accounts are varied only when the units to which the bus accounts are allocated have access to the bus in one bus cycle, or are varied only when the units to which the bus accounts are allocated do not have access to the bus in one bus cycle, that a unit which is requesting the allocation of the bus is allocated the bus only when the bus account which is allocated to the relevant unit, in the situation when the relevant unit is allocated the bus, would not rise as a result of the increase resulting from the bus access to such an extent that it is greater than a specific limit value, that a unit which requests the bus is allocated the bus provided the bus account which is allocated to it is not greater than a specific limit value, or provided the bus account which is allocated to it is not greater than a specific limit value, with the limit value being, for example, the value by which the bus account would be varied as a result of the allocation of the bus, that the limit value is a value other than 0, that the allocation of the bus to a unit which is requesting the allocation of the bus is made dependent on the ratio of the magnitudes of selected bus accounts, or of all the bus accounts, that, instead of varying the bus accounts or in addition to varying the bus accounts, the conditions are varied which the bus accounts must satisfy for a unit which is requesting the bus to be allocated the bus, that the conditions which the bus accounts must satisfy in order that a unit which is requesting the bus is allocated the bus differ for the various units which can request the bus, that the bus allocation is defined as a function of the bus accounts only when a number of units are requesting the bus at the same time, the values by which the bus accounts are in each case varied are made dependent on whether, and possibly which, further units have requested the bus at the same time, that the values by which the bus accounts are in each case varied are made dependent on the bus accounts of the units which have requested the bus at the same time, and/or that the allocation of the bus is carried out also taking into account priorities which are allocated to the units which can request the bus.

Modifications to the design of the bus controller shown in FIG. 2 are also possible.

In particular, there is no necessity for each unit which may be the bus master to have its own associated bus account.

It is also possible to provide for two or more bus masters to be allocated only a single, joint bus account, and for the value of this single bus account to be used to determine whether, and possible which, unit will be allocated the bus.

In particular when a bus account is associated with "only" two units, a bus account may, for example, be administered such that it is increased when the bus is allocated to the one unit, and is reduced when the bus is allocated to the other unit, and such that the mathematical sign of the bus account is used to determine whether, and possibly which, unit will be allocated the bus.

The joint bus account could also be administered such that there is no distinction between which bus master is allocated the bus, that is to say such that the bus account is, for example, reduced when one of the units to which the joint bus account is allocated is allocated the bus, and is increased when none of the units to which the joint bus account is allocated is allocated the bus. In consequence, those units to which the joint bus account is allocated are handled as a bus master group, and the value of the bus account is used to decide whether this group can or has to be allocated the bus.

It is also possible to provide for mixed operation, with one or more units being allocated a bus account, and with one or more other units not being allocated a bus account. There are a number of options in this case for the conditions for allocating the bus to units without a bus account; they can be given higher priority, so that the bus is always allocated to them in response to an appropriate request, or they can be given lower priority, so that the bus is never allocated to them when a number of bus requests occur at the same time, or it is possible to use the values of the bus accounts of the other bus masters to determine whether the bus is allocated to them.

Since the bus allocation is carried out solely or additionally taking into account the values of the bus accounts of all, or of specific, other units, can also be practised for units requesting the bus and to which a bus account is allocated.

The described bus system makes it possible to ensure, irrespective of the details of the practical implementation, that a unit which has data to output or which requires data from another unit can obtain access to the bus within a certain maximum time.

We claim:

1. A bus system, comprising:
   a bus;
   a plurality of units connectable to one another through said bus; and
   a bus controller configured to receive from said units requests for bus access when said units require a connection to one or more other said units, and to decide which unit will be allocated said bus;
   wherein at least some of said units that can request bus access are allocated values indicating how long and/or how frequently a respective unit can be or has been allocated said bus, and
   wherein either said bus controller is configured to use the values to decide whether a respective said unit requesting bus access is allocated the bus, or said units are configured to use the values to decide whether a unit requiring bus access is even requesting said bus,
   the values being responsive to specific conditions, and values allocated to units being variable independently of one another, such that a unit requesting bus access is allocated the bus within a maximum time.

2. The bus system according to claim 1, wherein the value are increased by specific amount, are reduced by a specific amount, or are set to an initial value, when a specific condition is present.

3. The bus system according to claim 2, wherein amounts by which the values are increased when a specific condition is present have different magnitudes for those units to which such a value is allocated.

4. The bus system according to claim 2, wherein amounts by which the values are reduced when a specific condition is present have different magnitudes for those units to which such a value is allocated.

5. The bus system according to claim 2, wherein the amounts by which the values are increased or reduced when a specific condition is present are variable during an operation of the bus system.

6. The bus system according to claim 2, wherein a value allocated to a given said unit that is currently not accessing said bus is increased by the specific amount.

7. The bus system according to claim 2, wherein a value allocated to a given said unit that is currently accessing said bus is reduced by the specific amount.

8. The bus system according to claim 2, wherein a value allocated to a given said unit that is currently not accessing said bus is reduced by the specific amount.

9. The bus system according to claim 2, wherein a value allocated to a given said unit that is currently accessing said bus is increased by the specific amount.

10. The bus system according to claim 2, wherein the values are changed in each bus cycle.

11. The bus system according to claim 2, wherein a respective said unit that is requesting said bus is allocated said bus only if the value associated with said unit would not fall, as a result of the reduction resulting from the bus access, to below a specific limit value, or not rise, as a result of the increase resulting from the bus access, to above a specific limit value.

12. The bus system according to claim 11, wherein the limit value is 0.

13. The bus system according to claim 1, wherein initial values for different said units have mutually different magnitudes and are variable during an operation of the bus system.

14. The bus system according to claim 1, wherein an amount by which a value is increased when a specific condition is present, and an amount by which the value is reduced when a specific condition is present have magnitudes independent of one another.

15. The bus system according to claim 1, wherein a unit that is requesting said bus is allocated said bus only if the value associated with said unit is not greater than a specific limit value.

16. The bus system according to claim 15, wherein the limit value is 0.

17. The bus system according to claim 1, wherein a unit that is requesting said bus is allocated said bus only if the value associated with said unit is not less than a specific limit value.

18. The bus system according to claim 17, wherein the limit value is 0.

19. The bus system according to claim 1, wherein said bus controller includes a memory storing the values allocated to the units, and the values are administered in said bus controller.

20. The bus system according to claim 1, wherein the values that are allocated to said units are stored and administered in the respective said units.

21. The bus system according to claim 1, wherein the bus allocation is made dependent on a ratio of the magnitudes of selected ones of the values allocated to said units.

22. The bus system according to claim 1, wherein the bus allocation is made dependent on a ratio of the magnitudes of all of the values allocated to said units.

23. The bus system according to claim 1, wherein the conditions which the values that are allocated to said units must satisfy in order that a unit which is requesting the bus is allocated the bus are variable.

24. The bus system according to claim 1, wherein the conditions which the values that are allocated to said units must satisfy in order that a unit which is requesting the bus is allocated the bus are different for different units.

25. The bus system according to claim 1, wherein said bus controller is configured to judge the values allocated to all said units that are requesting bus access and, as a result thereof, to allow bus access for one of said units.

26. The bus system according to claim 1, wherein only selected said units are allocated a value, and the bus allocation to the remaining units depends on the values allocated to the selected said units.

27. The bus system according to claim 1, wherein only selected said units are allocated a value, and the bus allocation is carried out taking into account priorities assigned to the remaining said units.

28. The bus system according to claim 1, wherein an amount by which a value allocated to a respective said unit is varied depends on which other units have simultaneously requested the bus.

29. The bus system according to claim 1, wherein an amount by which value allocated to a respective said unit is varied depends on the values allocated to said units that have simultaneously requested the bus.

* * * * *

UNITED STATES PATENT AND TRADEMARK OFFICE
CERTIFICATE OF CORRECTION

| | |
|---|---|
| PATENT NO. | : 6,996,646 B2 |
| APPLICATION NO. | : 10/116172 |
| DATED | : February 7, 2006 |
| INVENTOR(S) | : Jens Barrenscheen et al. |

It is certified that error appears in the above-identified patent and that said Letters Patent is hereby corrected as shown below:

<u>Column 7,</u>
Lines 64 and 65, should read as follows:

2.The bus system according to claim 1, wherein the values
are increased by a specific amount, are reduced by a specific Signed and Sealed this Twentieth Day of June, 2006

JON W. DUDAS
*Director of the United States Patent and Trademark Office*